(12) United States Patent
Iizuka et al.

(10) Patent No.: US 9,073,551 B2
(45) Date of Patent: Jul. 7, 2015

(54) VEHICLE CONTROL APPARATUS, VEHICLE, AND MOTOR

(71) Applicant: YAMAHA HATSUDOKI KABUSHIKI KAISHA, Iwata-shi, Shizuoka (JP)

(72) Inventors: Shinya Iizuka, Shizuoka (JP); Yasunori Murayama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/349,409

(22) PCT Filed: Oct. 3, 2012

(86) PCT No.: PCT/JP2012/075710
§ 371 (c)(1),
(2) Date: Apr. 3, 2014

(87) PCT Pub. No.: WO2013/051627
PCT Pub. Date: Apr. 11, 2013

(65) Prior Publication Data
US 2014/0288791 A1     Sep. 25, 2014

(30) Foreign Application Priority Data
Oct. 7, 2011   (JP) .................. 2011-222912

(51) Int. Cl.
| | | |
|---|---|---|
| G06F 17/00 | (2006.01) |
| B60W 30/19 | (2012.01) |
| B60W 10/06 | (2006.01) |
| F16H 61/04 | (2006.01) |

(Continued)

(52) U.S. Cl.
CPC .............. *B60W 30/19* (2013.01); *B60W 10/06* (2013.01); *F16H 61/04* (2013.01); *F16H 61/684* (2013.01); *F16H 61/688* (2013.01); *F16H 63/50* (2013.01); *B60W 10/113* (2013.01); *B60W 2710/0644* (2013.01); *B60W 2710/105* (2013.01); *F02B 61/02* (2013.01); *F02D 41/023* (2013.01); *F02D 41/307* (2013.01); *F02D 2200/101* (2013.01); *F02D 2250/21* (2013.01)

(58) Field of Classification Search
None
See application file for complete search history.

(56) References Cited

U.S. PATENT DOCUMENTS

| | | | |
|---|---|---|---|
| 5,478,293 A | 12/1995 | Yonezawa | |
| 7,162,353 B2 * | 1/2007 | Minowa et al. | ................. 701/96 |

(Continued)

FOREIGN PATENT DOCUMENTS

| | | |
|---|---|---|
| EP | 0 461 578 A1 | 12/1991 |
| JP | 4-46225 A | 2/1992 |

(Continued)

OTHER PUBLICATIONS

Official Communication issued in International Patent Application No. PCT/JP2012/075710, mailed on Oct. 30, 2012.

*Primary Examiner* — Dirk Wright
(74) *Attorney, Agent, or Firm* — Keating & Bennett, LLP

(57) ABSTRACT

A vehicle control apparatus includes a target value determination unit to determine a target engine torque, a target value restriction unit to restrict a target engine torque such that an output torque becomes smaller than a load torque input from a torque transmission path to an engine when a rotation speed of the engine exceeds a threshold, and a restriction release unit to release a restriction on the target engine torque before an inertia phase is started during a gear change period.

8 Claims, 15 Drawing Sheets

(51) Int. Cl.
  *F16H 61/684*   (2006.01)
  *F16H 61/688*   (2006.01)
  *F16H 63/50*    (2006.01)
  *B60W 10/113*   (2012.01)
  *F02D 41/02*    (2006.01)
  *F02D 41/30*    (2006.01)
  *F02B 61/02*    (2006.01)

(56) References Cited

U.S. PATENT DOCUMENTS

| | | | |
|---|---|---|---|
| 7,512,474 B2 * | 3/2009 | Tabata et al. | 701/91 |
| 8,396,636 B2 * | 3/2013 | Minami | 701/67 |
| 8,412,430 B2 * | 4/2013 | Arai | 701/68 |
| 2004/0166990 A1 | 8/2004 | Buchanan et al. | |
| 2004/0166991 A1 | 8/2004 | Buchanan et al. | |
| 2004/0172184 A1 | 9/2004 | Vukovich et al. | |
| 2007/0026997 A1 | 2/2007 | Tohta et al. | |
| 2009/0084210 A1 | 4/2009 | Tsukada et al. | |
| 2011/0054752 A1 | 3/2011 | Arai | |

FOREIGN PATENT DOCUMENTS

| | | |
|---|---|---|
| JP | 6-330777 A | 11/1994 |
| JP | 10-227355 A | 8/1998 |
| JP | 10-238620 A | 9/1998 |
| JP | 2001-221336 A | 8/2001 |
| JP | 2004-251456 A | 9/2004 |
| JP | 2007-56862 A | 3/2007 |
| JP | 2007-239909 A | 9/2007 |
| JP | 2009-85324 A | 4/2009 |
| JP | 2009-162357 A | 7/2009 |
| JP | 2011-47511 A | 3/2011 |

* cited by examiner

| SHIFT STEP \ ACCELERATOR OPENING DEGREE | 0 | 20 | 40 | 60 | 80 |
|---|---|---|---|---|---|
| 1→2 | 100 | 100 | 100 | 100 | 100 |
| 2→3 | 100 | 100 | 100 | 100 | 100 |
| 3→4 | 100 | 100 | 100 | 100 | 100 |
| 4→5 | 100 | 100 | 100 | 100 | 100 |
| 5→6 | 100 | 100 | 100 | 100 | 100 |

(mS)

| THROTTLE OPENING DEGREE(deg) | 0 | 10 | 20 | 30 | 40 | 80 |
|---|---|---|---|---|---|---|
| ENGINE ROTATION SPEED | 15000 | 13750 | 13500 | 13250 | 13000 | 13000 |

VEHICLE CONTROL APPARATUS, VEHICLE, AND MOTOR

BACKGROUND OF THE INVENTION

1. Field of the Invention

The present invention relates to a vehicle control apparatus, a vehicle, and a motor, and in particular, to transmission control in a twin clutch type vehicle.

2. Description of the Related Art

Conventionally, a twin clutch type vehicle has been known (see, for example, Japanese Patent Application Publication No. 2004-251456). A twin clutch type vehicle includes two clutches mounted downstream of the engine to individually receive an output torque from the engine and two dog clutch type transmission mechanisms mounted downstream of the respective clutches and including a common output shaft. In a gear change period, switching control to switch transmission paths of output torque from one clutch and transmission mechanism to another clutch and transmission mechanism and rotation control to change the rotation speed of the engine by ensuring a difference between the output torque of the engine and the torque capacity of the clutch are executed.

In a vehicle, such as a motorcycle or the like, over-revolution control is executed to restrict rotation speed of the engine by fuel cut or the like when the engine rotates excessively. Under the over-revolution control, a target value of an output torque is restricted to a negative value to make the engine brake effective. Note here that an output torque is at a negative value indicates that an output torque output from an engine to a transmission path is smaller than a load torque input from the transmission path to the engine.

When over-revolution control ends while the rotation control is executed during a gear change period in the above mentioned twin clutch-type vehicle, an output torque from the engine immediately returns to its normal value, while a torque capacity of the clutch is delayed in returning to its normal value, which causes delay in decrease of the engine rotation speed. Then, when the torque capacity of the clutch is sharply increased in order to promote the decrease of the engine rotation speed, shift shock is caused.

Meanwhile, a method is available to increase the output torque from the engine and the torque capacity of the clutch gradually in order to prevent shift shock (see Japanese Patent Laid-open Publication No. 2007-056862). In this case, however, an output torque from the engine cannot be sufficiently utilized, which could otherwise be sufficiently utilized.

SUMMARY OF THE INVENTION

Accordingly, preferred embodiments of the present invention provide a vehicle control apparatus, a vehicle, and a motor capable of preventing shift shock and efficiently utilizing an output torque from an engine.

A vehicle control apparatus according to a preferred embodiment of the present invention is mounted in a vehicle including an engine, two clutches mounted downstream of the engine to individually receive an output torque from the engine, two actuators to change torque capacities of the respective clutches, and two dog clutch type transmission mechanisms mounted downstream of the respective clutches and including a common output shaft. During a gear change period, the vehicle control apparatus executes switching control to switch transmission paths of the output torque from one clutch and transmission mechanism to another clutch and transmission mechanism and executes rotation control to change a rotation speed of the engine by ensuring a difference between the output torque and the torque capacity. The vehicle control apparatus includes a target value determination unit configured and programmed to determine a target value of the output torque; a target value restriction unit configured and programmed to restrict the target value such that the output torque becomes smaller than a load torque input from the transmission path to the engine when the rotation speed of the engine exceeds a threshold; and a restriction release unit configured and programmed to release a restriction on the target value before the rotation control is started during the gear change period.

Further, a vehicle control apparatus according to a preferred embodiment of the present invention is mounted in a vehicle including an engine, two clutches mounted downstream of the engine to individually receive an output torque from the engine, two actuators to change torque capacities of the respective clutches, and two dog clutch type transmission mechanisms mounted downstream of the respective clutches and including a common output shaft. During a gear change period, the vehicle control apparatus executes switching control to switch transmission paths of the output torque from one clutch and transmission mechanism to another clutch and transmission mechanism and executes rotation control to change a rotation speed of the engine by ensuring a difference between the output torque and the torque capacity. The vehicle control apparatus includes a target value determination unit configured and programmed to determine a target value of the output torque, a target value restriction unit configured and programmed to restrict the target value such that the output torque becomes smaller than a load torque input from the transmission path to the engine when the rotation speed of the engine exceeds a threshold; and a target value change unit configured and programmed to change the target value such that the output torque becomes larger than the load torque before a time when the rotation speed of the engine becomes smaller than the threshold during the gear change period.

A vehicle according to another preferred embodiment of the present invention includes the above described vehicle control apparatus. A motor according to a further preferred embodiment of the present invention includes the above described vehicle control apparatus.

According to various preferred embodiments of the present invention, it is possible to prevent shift shock and to efficiently utilize an output torque from the engine as the output torque becomes larger than a load torque before the rotation speed of the engine becomes smaller than a threshold during a gear change period.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of a vehicle control apparatus, a vehicle, and a motor according to the present invention will be described with reference to the drawings.

Figure 1:
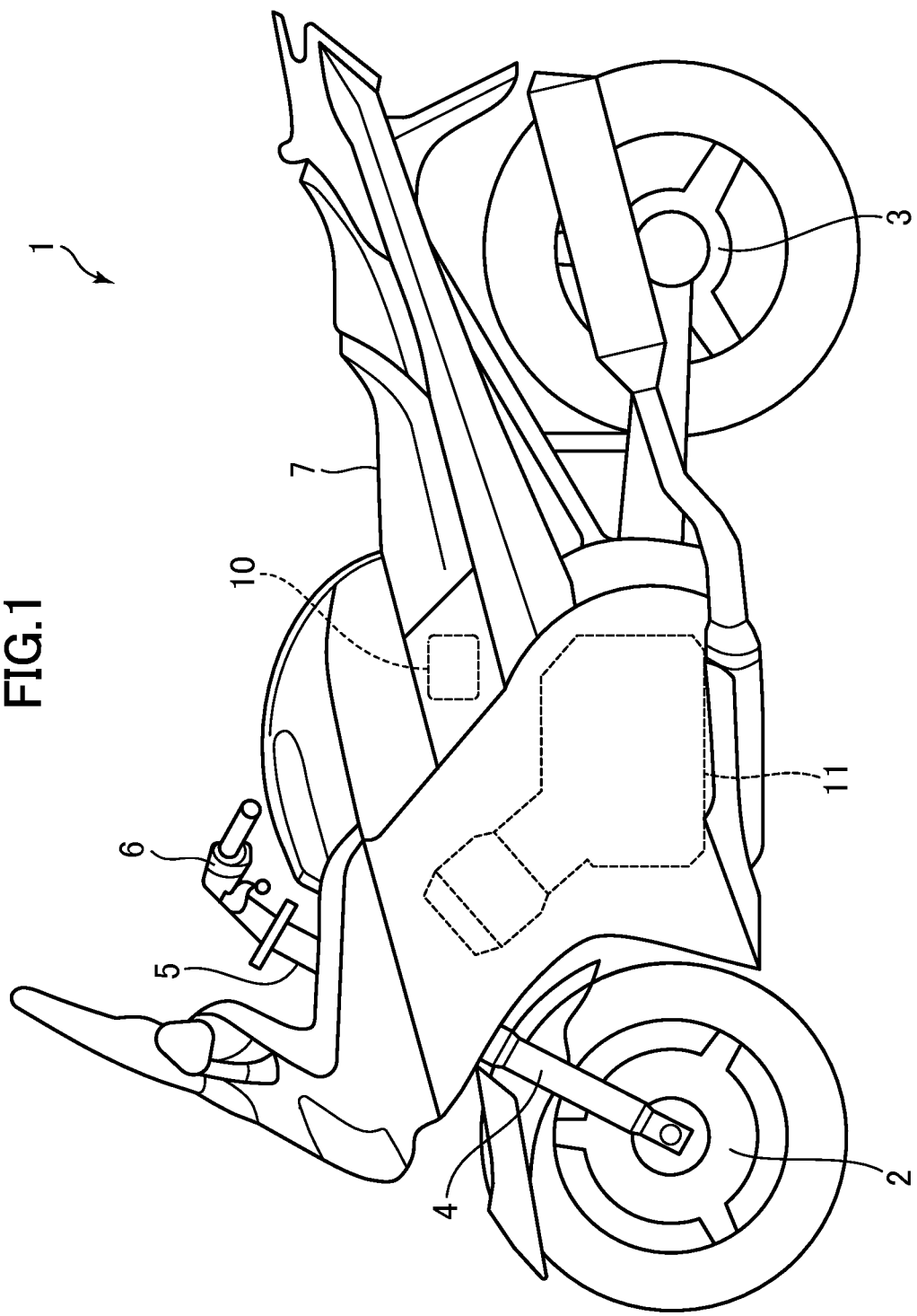
FIG. 1 is a side view of a motorcycle including a control device according to a preferred embodiment of the present invention.
Figure 2:
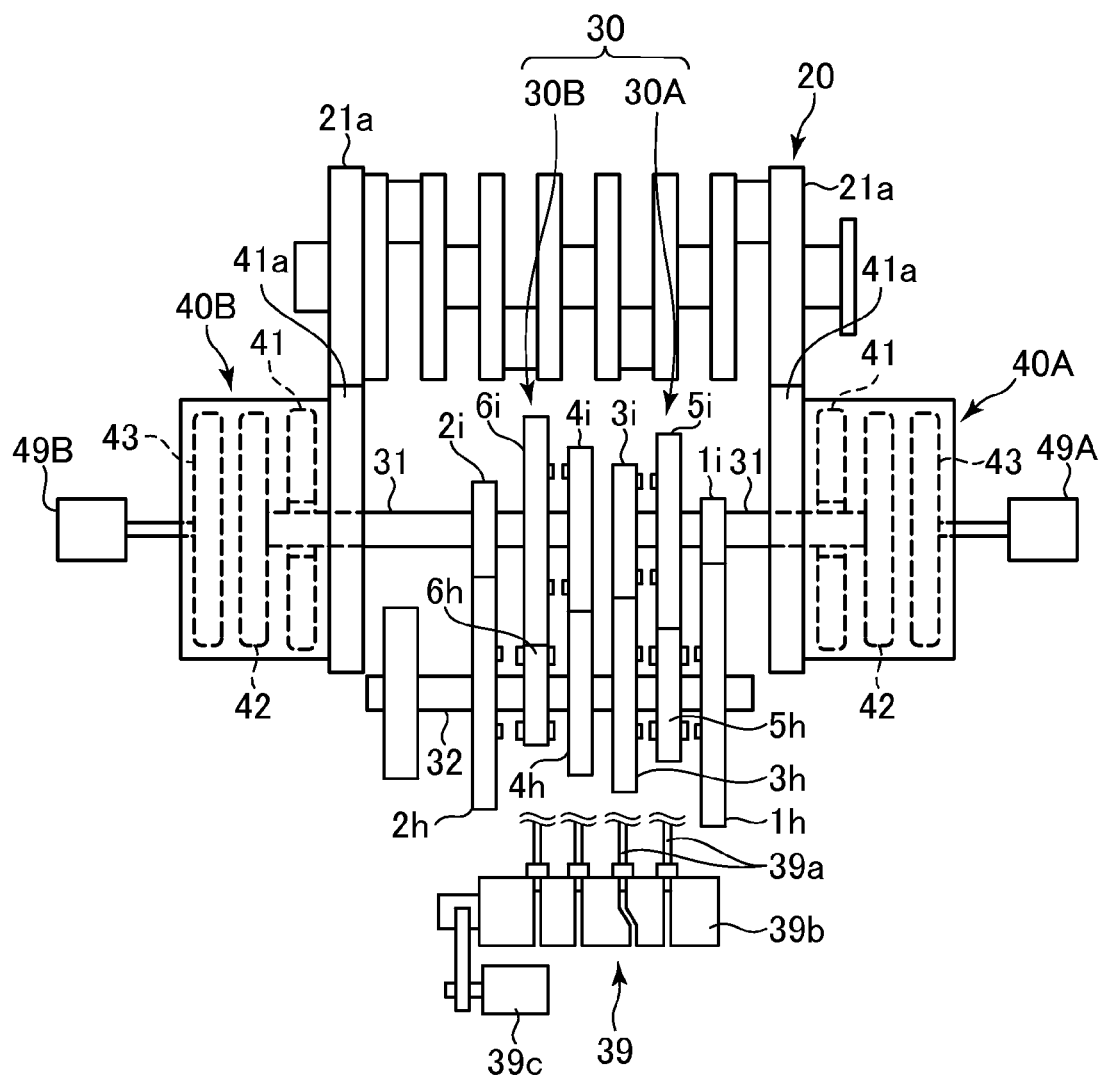
FIG. 2 schematically shows a mechanism provided in a torque transmission path extending from an engine to a rear wheel of the above mentioned motorcycle.
Figure 3:
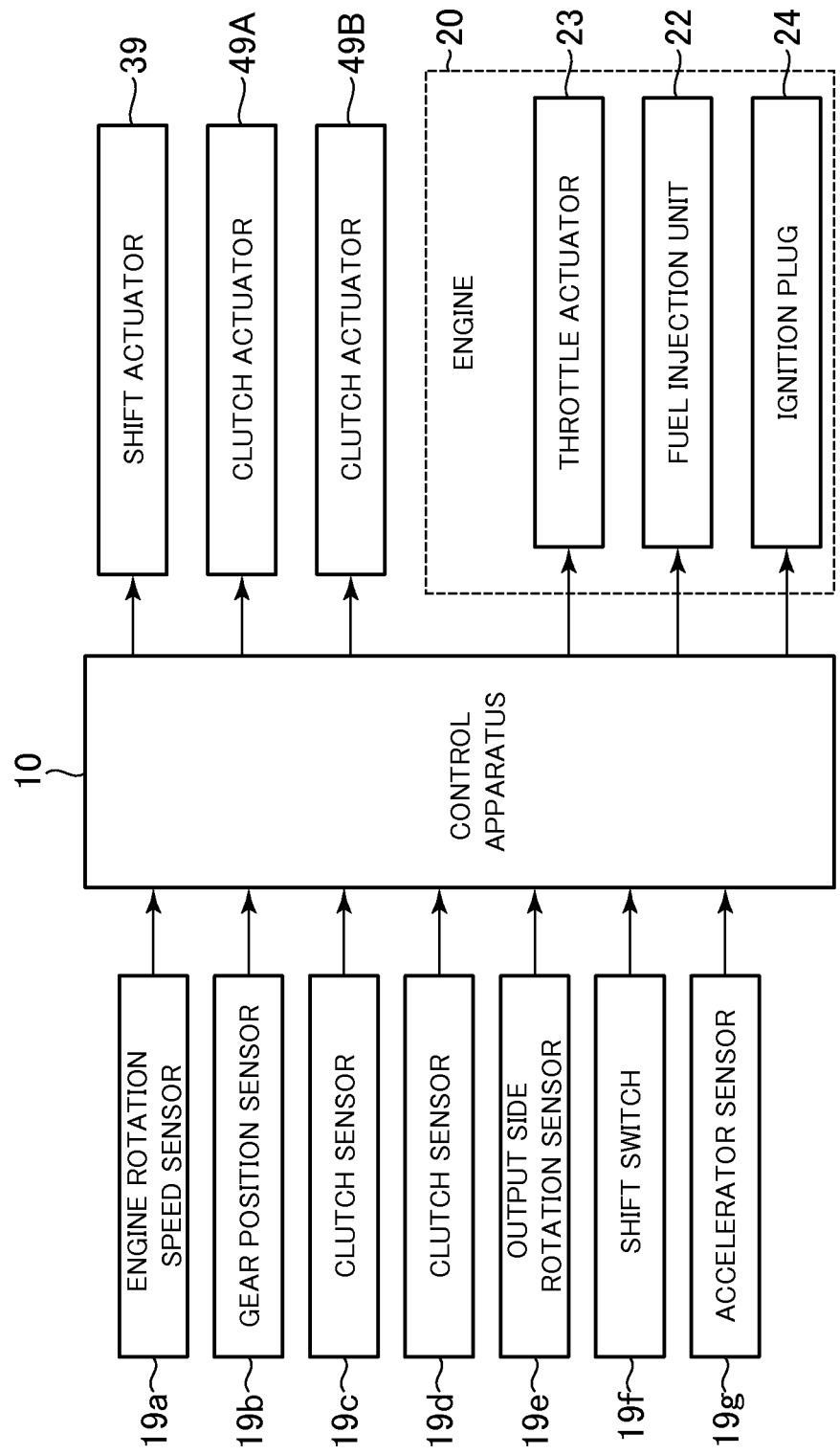
FIG. 3 is a block diagram showing a structure of the above mentioned motorcycle.

FIG. 1 is a side view of a motorcycle 1 including a control apparatus 10 according to a preferred embodiment of the present invention. FIG. 2 schematically shows a mechanism provided in a torque transmission path extending from an engine 20 to a rear wheel 3. FIG. 3 is a block diagram showing a structure of the motorcycle 1 according to a preferred embodiment of a vehicle of the present invention.

As shown in FIG. 1, the motorcycle 1 includes an engine unit 11 according to a preferred embodiment of a motor of the present invention. A front wheel 2, mounted ahead of the engine unit 11, is supported by the lower end of a front fork 4. A steering shaft 5 rotatably supported in the foremost portion of a vehicle body frame (not shown) is connected to the upper portion of the front fork 4. A steering handle 6 is mounted at the top of the steering shaft 5. The steering handle 6, the front fork 4, and the front wheel 2 are integrally rotatable in the left to right direction with the steering shaft 5 at the center.

A seat 7 for a driver to sit on while straddling the vehicle is mounted behind the steering handle 6. A rear wheel 3 is mounted behind the engine unit 11. A torque output from a transmission 30 (see FIG. 2) is transmitted to the rear wheel 3 by a torque transmitting member (not shown), such as a chain, a belt, a drive shaft, and the like.

As shown in FIG. 2, the engine unit 11 includes the engine 20 and the transmission 30. The motorcycle 1 preferably is a so-called twin clutch type vehicle, and includes a first clutch 40A and a second clutch 40B provided in the engine unit 11, for example. The engine 20 includes a crankshaft 21 that rotates as it is driven by the engine 20.

A torque (the rotation of the crankshaft 21) of the engine 20 is input to the first clutch 40A and the second clutch 40B, respectively. The first clutch 40A and the second clutch 40B each include a driving member 41 that interlinks the rotation of the crankshaft 21. In the example shown in FIG. 2, the crankshaft 21 includes two primary gears 21a. A primary gear 41a is provided for each of the driving member 41 of the first clutch 40A and the driving member 41 of the second clutch 40B. The primary gear 41a is engaged with the primary gear 21a.

The first clutch 40A and the second clutch 40B each include a following member 42 that interlinks an input shaft 31 of a transmission mechanism 30A, 30B to be described below. The first clutch 40A and the second clutch 40B preferably are each a single plate or multi-plate friction clutch, for example. The driving member 41 and the following member 42 are pressed toward each other in the shaft direction, such that a torque is transmitted between them. The driving member 41 includes a friction disk, for example, and the following member 42 includes a clutch disk, for example.

The transmission 30 includes the first transmission mechanism 30A and the second transmission mechanism 30B. The first transmission mechanism 30A and the second transmission mechanism 30B are mounted downstream of the first clutch 40A and the second clutch 40B, respectively. That is, the input shafts 31 are provided in each of the first transmission mechanism 30A and the second transmission mechanism 30B. The input shaft 31 of the first transmission mechanism 30A is connected to the following member 42 of the first clutch 40A so that torque is input to the first transmission mechanism 30A via the first clutch 40A. Meanwhile, the input shaft 31 of the second transmission mechanism 30B is connected to the following member 42 of the second clutch 40B so that torque is input to the second transmission mechanism 30B via the second clutch 40B. The first transmission mechanisms 30A, 30B share a common output shaft 32. As described above, the motorcycle 1 includes two paths as a torque transmission path extending from the crankshaft 21 of the engine 20 to the output shaft 32 of the transmission 30. The first path includes the first transmission mechanism 30A and the first clutch 40A, and the second path includes the second transmission mechanism 30B and the second clutch 40B. The output shaft 32 of the transmission 30 is connected to the axle of the rear wheel 3 via a torque transmission member including a chain, a belt, a shaft, or the like.

The first transmission mechanism 30A and the second transmission mechanism 30B include a plurality of gears 1i to 6i and 1h to 6h. The gears 1i to 6i are mounted on the input shaft 31, and the gears 1h to 6h are mounted on the output shaft 32. The gears 1i and the gear 1h are engaged with each other, of which the reduction ratio corresponds to the 1st gear. Similarly, the gears 2i to 6i are engaged with the respective gears 2h to 6h, of which the reduction ratios correspond to the respective 2nd to 6th gears. In this example, the first transmission mechanism 30A includes the gears 1i, 3i, 5i, 1h, 3h, 5h, corresponding to odd numbered shift steps, while the second transmission mechanism 30B includes the gears 2i, 4i, 6i, 2h, 4h, 6h, corresponding to even numbered shift steps.

Each of the transmission mechanisms 30A, 30B preferably is a so-called sliding selective type transmission mechanism. Either one of the paired gears (for example, the gears 1i and 1h) corresponding to each shift step is held so as to be rotatable relative to the shaft on which the gear is mounted. Meanwhile, the other of the paired gears is spline engaged with the shaft on which the gear is mounted so as to integrally rotate with the shaft. In this example, the gears 1h, 5i, 3h, 4h, 6i, 2h are held so as to be rotatable relative to the respective shafts on which these gears are mounted. The gears 1i, 5h, 3i, 4i, 6h, 2i are engaged with the respective shafts on which these gears are mounted so as to integrally rotate with the shafts. Thus, at a neutral state (a state with neither shift step set), the gear pairs (5i, 5h) and (6i, 6h) interlock the output shaft 32, and the gear pairs (1i, 1h), (3i, 3h), (4i, 4h), and (2i, 2h) interlock the input shaft 31.

A gear that interlocks the input shaft 31 and a gear that interlocks the output shaft 32 are positioned adjacent to each other in the shaft direction for relative movement in the shaft direction (movable in an approaching direction and a separating direction). Further, the plurality of gears 1i to 6i, 1h to 6h include a gear including a dog clutch provided thereon. A gear that interlocks the input shaft 31 and a gear that interlocks the output shaft 32 are arranged to engage with each other by the dog clutch. With the engagement of these two gears, rotation (torque) of the input shaft 31 of the first transmission mechanism 30A or the input shaft 31 of the second transmission mechanism 30B is transmitted to the output shaft 32. In the example shown in FIG. 2, the gears 5h, 3i, 4i, 6h are movable in the shaft direction.

As shown in FIG. 2, the transmission 30 includes a shift actuator 39 to move the gears, which are movable in the shaft direction, 5h, 3i, 4i, 6h (hereinafter referred to as a movable gear) in the shaft direction. The shift actuator 39 includes a plurality of shift forks 39a to be hooked on the respective movable gears, a shift cam 39b to move by rotating the shift fork 39a in the shaft direction, an electric motor 39c to generate a driving force to rotate the shift cam 39b, and the like. The shift actuator 39 moves a movable gear under the control of the control apparatus 10 to shift the shift steps.

Clutch actuators 49A, 49B are provided to move the clutches 40A, 40B under the control of the control apparatus 10 (that is, to put the clutches 40A, 40B in an engaged state or a released state). Each of the clutch actuators 49A, 49B includes an electric motor, for example. A driving force of the electric motor is transmitted to a pressure plate 43 by oil pressure or a rod to press the driving member 41 and the following member 42 toward each other in the shaft direction.

As shown in FIG. 3, a fuel injection unit 22, a throttle actuator 23, and an ignition plug 24 are provided in the engine 20. The fuel injection unit 22 supplies fuel to the engine 20 for combustion in a combustion chamber of the engine 20. The throttle actuator 23 controls the opening degree of a throttle valve (not shown) to adjust the amount of air flowing in an intake path of the engine 20. The ignition plug 24 ignites the mixture of the fuel and the air flowing in the combustion chamber of the engine 20. The amount of fuel injected by the fuel injection unit 22, an ignition timing by the ignition plug 24, and a throttle valve opening degree (hereinafter referred to as a throttle opening degree) are controlled by the control apparatus 10.

The motorcycle 1 includes an engine rotation speed sensor 19a, a gear position sensor 19b, clutch sensors 19c, 19d, an output side rotation sensor 19e, a shift switch 19f, and an accelerator sensor 19g. These sensors are connected to the control apparatus 10.

The engine rotation speed sensor 19a includes a rotation sensor to output a pulse signal having a frequency in accordance with the engine rotation speed. The control apparatus 10 calculates the engine rotation speed (the rotation speed of the crankshaft 21) based on an output signal of the engine rotation speed sensor 19a.

The gear position sensor 19b includes a potentiometer to output a voltage signal in accordance with the rotation angle of the shift cam 39, for example. The control apparatus 10 determines the positions of the movable gears 5h, 3i, 4i, 6h and the current shift step based on an output signal from the gear position sensor 19b.

The output side rotation sensor 19e is mounted on the axle of the rear wheel 3 or the output shaft 32. The output side rotation sensor 19e is a rotation sensor that outputs a pulse signal having a frequency corresponding to the rotation speed of the rear wheel 3 or of the output shaft 32, for example. The control apparatus 10 calculates the vehicle speed or the rotation speed of the output shaft 32 based on an output signal from the output side rotation sensor 19e.

The shift switch 19f is a switch operated by a driver, and inputs a transmission instruction made by the driver (a signal indicating a shift-up instruction to increase the shift step and a signal indicating a shift-down instruction to decrease the shift step) to the control apparatus 10. As the shift switch 19f, a shift-up switch and a shift-down switch are preferably both provided.

The accelerator sensor 19g outputs a signal in accordance with the amount of operation (a rotation angle) of an accelerator grip (not shown) provided on the steering handle 6. The accelerator sensor 19g includes a potentiometer, for example. The control apparatus 10 determines the amount of operation (an accelerator operation amount) of the accelerator grip based on an output signal from the accelerator sensor 19g.

The clutch sensor 19c is a sensor that determines the transmission torque capacity (the maximum torque that can be transmitted by the first clutch 40A in the current state (a current engaged degree)) of the first clutch 40A. Further, the clutch sensor 19d is a sensor that determines the transmission torque capacity (the maximum torque that can be transmitted by the second clutch 40B in the current state (a current engaged degree)) of the second clutch 40B. The transmission torque capacity is maximized when the clutches 40A, 40B are in an engaged state, and minimized (for example, 0 Nm) when the clutches 40A, 40B are in a released state. Each of the clutch sensors 19c, 19d determines, for example, a displaced amount of the pressure plate 43.

The transmission torque capacity corresponds to the position (a clutch stroke amount) of the clutch 40A, 40B. Each clutch sensor 19c, 19d is a potentiometer that outputs a signal in accordance with the position of the clutch 40A, 40B, for example (a signal in accordance with an operation amount of the clutch actuator 49A, 49B). The control apparatus 10 determines the transmission torque capacity, based on the clutch position determined based on an output signal from the clutch sensor 19c, 19d. For example, the control apparatus 10 calculates the transmission torque capacity, based on the clutch position determined, using a map that correlates a clutch position and a transmission torque capacity or a calculation expression.

In a structure in which the clutch actuator 49A, 49B moves the clutch 40A, 40B by oil pressure, the transmission torque capacity corresponds to an oil pressure applied to the clutch 40A, 40B (hereinafter referred to as a clutch pressure). In such a structure, each clutch sensor 19c, 19d may be a hydraulic sensor that outputs a signal in accordance with the clutch pressure. In this case, the control apparatus 10 determines the transmission torque capacity based on the clutch pressure determined based on an output signal from the clutch sensor 19c, 19d. For example, the control apparatus 10 calculates the transmission torque capacity, based on the clutch pressure determined, using a map that correlates a clutch pressure and a transmission torque capacity, or a calculation expression.

Further, the transmission torque capacity corresponds to a force applied from the clutch actuator 49A, 49B to the clutch 40A, 40B (a pressing force applied to the driving member 41 and the following member 42). With the force applied from each clutch actuator 49A, 49B to the respective clutch 40A, 40B, a portion receiving the force (for example, the case of the clutch 40A, 40B, or the like) is deformed. In view of the above, each clutch sensor 19c, 19d may be a deformation sensor that outputs a signal in accordance of the amount of deformation of the portion receiving a force from the clutch 40A, 40B. In this case, the control apparatus 10 determines the transmission torque capacity based on the deformation determined based on an output signal from the clutch sensor 19c, 19d. For example, the control apparatus 10 calculates the transmission torque capacity, based on the deformation determined, using a map that correlates a clutch deformation and a transmission torque capacity or a calculation expression.

The control apparatus 10 includes a CPU (Central Processing Unit), and a memory, such as a ROM (Read Only Memory), a RAM (Random Access Memory), and the like. The control apparatus 10 executes in the CPU programs stored in the memory to control the engine 20, the transmission 30, and the clutches 40A, 40B.

More specifically, the control apparatus 10 is programmed to set a target value for the output torque of the engine 20 (hereinafter referred to as a target engine torque), and drive the throttle actuator 23, the fuel injection unit 22, and the ignition plug 24 such that the actual output torque becomes equal to the target engine torque. Further, the control apparatus 10 is programmed to set a target value (hereinafter referred to as a target torque capacity) for the transmission torque capacity of the first clutch 40A and for the transmission torque capacity of the second clutch 40B, and move the clutch actuators 49A, 49B such that the respective actual transmission torque capacities become equal or substantially equal to the respective target torque capacities. Still further, the control apparatus 10 is programmed to move the shift actuator 39 such that each of the first transmission mechanism 30A and the second transmission mechanism 30B sets a shift step in accordance with a transmission instruction.

Below, an outline of transmission control will be described. In the description below, of the first clutch 40A and the second clutch 40B, a clutch that transmits the torque of the engine 20 before transmission is conducted is referred to as a prior clutch, and the other clutch (that is, a clutch that starts transmission of the torque of the engine 20 in response to a transmission instruction) is referred to as a next clutch. Similarly, of the first transmission mechanism 30A and the second transmission mechanism 30B, a transmission mechanism that transmits the torque of the engine 20 before transmission is conducted is referred to as a prior transmission mechanism, and the other transmission mechanism (that is, a transmission mechanism that starts transmission of the torque of the engine 20 in response to a transmission instruction) is referred to as a next transmission mechanism.

FIGS. 4A to 4D illustrate an outline of the transmission control. In the diagram, the transmission mechanisms 30A, 30B and the clutches 40A, 40B shown in FIG. 2 are shown more simplified. Specifically, in this diagram, the clutch Cp represents a prior clutch, and the clutch Cn represents a next clutch. Further, the transmission mechanism Tp represents a prior transmission mechanism, and the transmission mechanism Tn represents a next transmission mechanism. Still further, the gear Gp1 of the prior transmission mechanism Tp represents a movable gear (5h, 3i, 4i, or 6h) that transmits a torque at a previous shift step, and the gear Gp2 represents a stationary gear (1h, 5i, 3h, 4h, 6i, or 2h) that transmits a torque at the previous shift step. Yet further, the gear Gn1 of the next transmission mechanism Tn represents a movable gear that transmits a torque at the next shift step, and the gear Gn2 represents a stationary gear that transmits a torque at the next shift step. In this diagram, for simplification, one gear is shown as to each of the movable gears Gp1, Gn1 and one gear is shown as to each of the stationary gears Gp2, Gn2 are shown. In this diagram, the stationary gears Gp2, Gn2 are fixed to the output shaft 32 (that is, in spline engagement with the output shaft 32) to integrally rotate with the output shaft 32. Meanwhile, the movable gears Gp1, Gn1 can freely rotate relative to the output shaft 32. The movable gears Gp1, Gn1 are engaged with the gears Gp3, Gn3, respectively, fixed to the respective input shafts 31, and interlink the rotation of the respective gears Gp3, Gn3 and the respective input shafts 31.

Figure 4A:
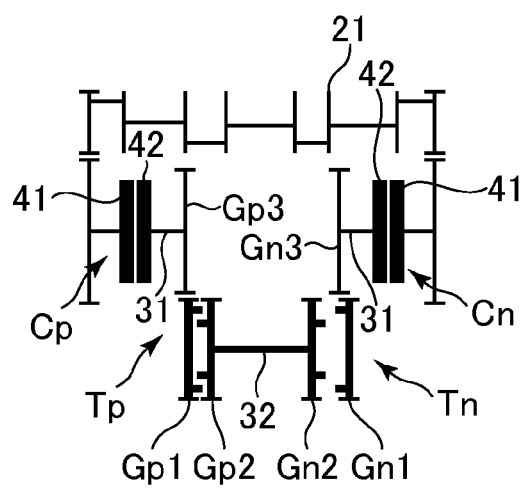
FIGS. 4A to 4D illustrate an outline of transmission control.
Figure 4B:
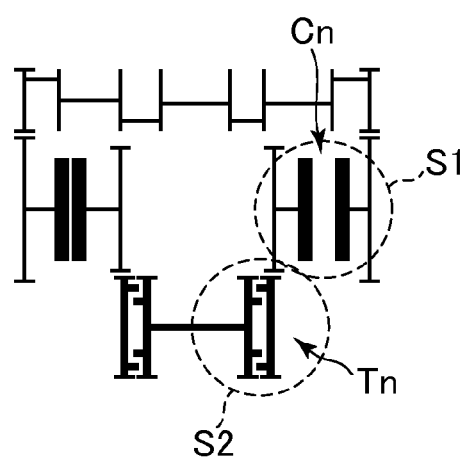
Figure 4C:
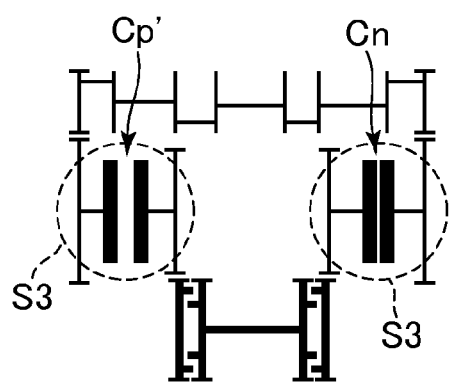
Figure 4D:
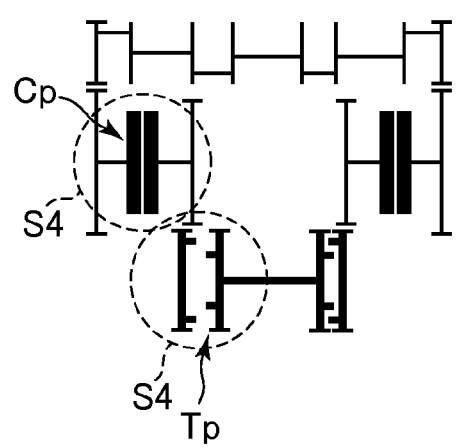

As shown in FIG. 4A, in normal running, the two clutches Cp, Cn are set in an engaged state (a state with the maximum transmission torque capacity). In the prior transmission mechanism Tp, the movable gear Gp1 and the stationary gear Gp2 corresponding to the previous shift step are engaged with each other by a dog clutch. In the next transmission mechanism Tn, all movable gears are placed in a neutral position (a position with no stationary gear engaged). Therefore, the torque of the engine 20 is transmitted to the rear wheel 3 via one of the two torque transmission paths (the prior clutch Cp and the prior transmission mechanism Tp). While torque transmission in the other path is disconnected in the next transmission mechanism Tn.

When a transmission instruction is provided, the control apparatus 10 switches the paths to transmit a torque from one to the other. That is, the control apparatus 10 causes the movable gear Gn1 and the stationary gear Gn2 of the next transmission mechanism Tn to be engaged with each other, and puts the movable gear Gp1 of the prior transmission mechanism Tp in a neutral position. Specifically, the transmission mechanisms Tp, Tn and the clutches Cp, Cn are moved as described below under transmission control. Specifically, the control apparatus 10 initially releases the engagement of the next clutch Cn, as indicated by S1 in FIG. 4B, and then moves the movable gear Gn1 of the next transmission mechanism Tn so as to be engaged with the adjacent stationary gear Gn2 (a so-called dog engagement phase), as indicated by S2. Thereafter, the control apparatus 10 causes the next clutch Cn to return from a released state to an engaged state, as indicated by S3 in FIG. 4C, and also puts the prior clutch Cp in a released state (a so-called torque phase). Finally, the control apparatus 10 moves the movable gear Gp1 of the prior transmission mechanism Tp to a neutral position, as indicated by S4 in FIG. 4D, and then puts the prior clutch Cp in the engaged state (a so-called dog release phase).

In execution of such transmission control, it may be necessary to conduct rotation control (a so-called inertia phase) to have the rotation speed of the driving member 41 of the prior clutch Cp or the next clutch Cn to be equal to that of the following member 42 before or after the torque phase (see S3 in FIG. 4C) in order to prevent increase and decrease of a driving force of the rear wheel 3 (a transmission shock) during transmission. A plurality of control modes for the transmission control by the control apparatus 10 to be described below are roughly grouped into ones in which the torque phase precedes the inertia phase, and ones in which the inertia phase precedes the torque phase.

Figure 5:
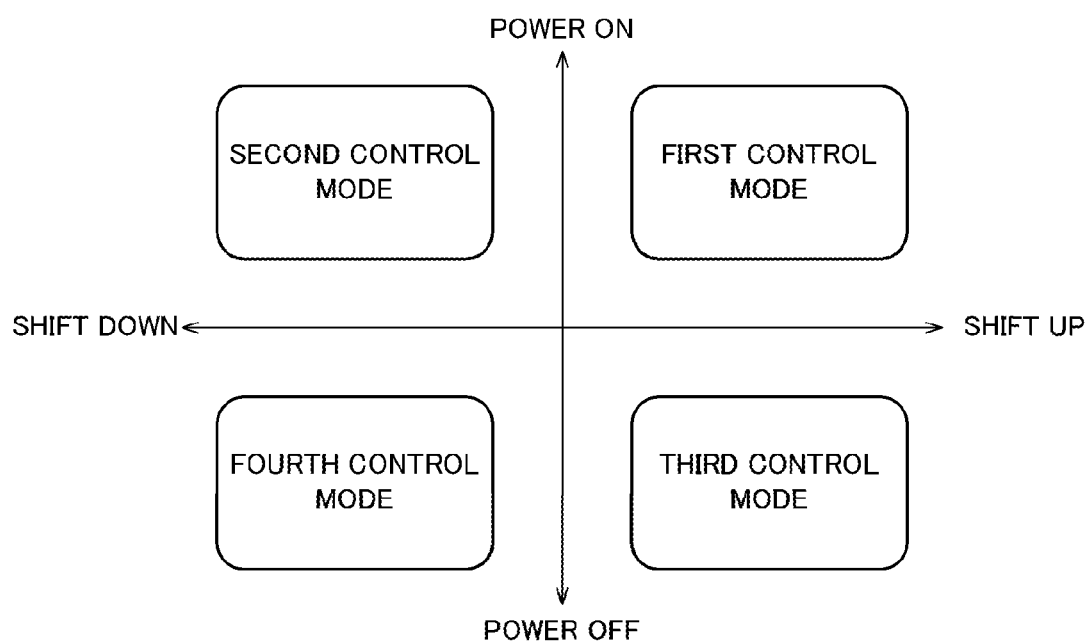
FIG. 5 shows a plurality of control modes for transmission control.

FIG. 5 shows the plurality of control modes for transmission control by the control apparatus 10. The control apparatus 10 includes, for example, four control modes for transmission control. The first control mode is for shift up control with the accelerator open (power on shift up control). The second control mode is for shift down control with the accelerator open (power on shift down control). The third control mode is for shift up control with the accelerator closed (power off shift up control). The fourth control mode is for shift down control with the accelerator closed (power off shift down control).

Figure 6:
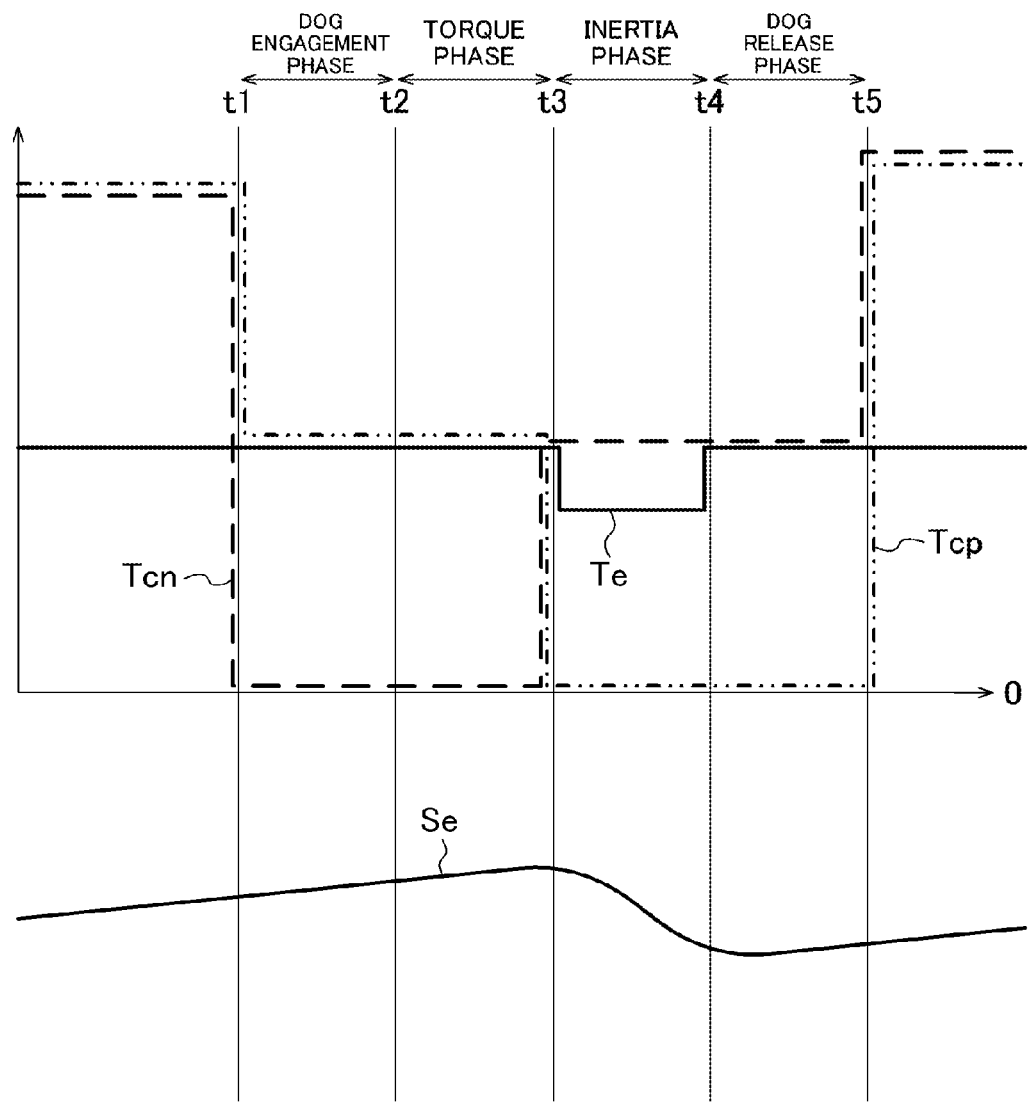
FIG. 6 is a time chart explaining an example of a first control mode.

In the following, a specific operation example in the first control mode (power on shift up control) will be described as a representative of the above mentioned first to fourth control modes. FIG. 6 is a time chart explaining an example of the first control mode (power on shift up control). In the diagram, the solid line in the upper portion indicates the target engine torque Te; the broken line indicates the target torque capacity Tcn of the next clutch Cn; and the long dashed double-short dashed line indicates the target torque capacity Tcp of the prior clutch Cp; and the solid line in the lower portion indicates the engine rotation speed Se. The broken line and the long dashed double-short dashed line indicate a value obtained by dividing the target torque capacity by a primary reduction ratio. Note that in this diagram, the respective lines are displaced from each other in the vertical or horizontal direction to avoid overlap. In the first control mode, the torque phase and the inertia phase are executed in this order.

Initially, the control apparatus 10 starts the dog engagement phase (t1). Specifically, the control apparatus 10 changes the next clutch Cn from the engaged state to the released state. The engaged state refers to a state with the maximum transmission torque capacity, and the released state refers to a state with the minimum transmission torque capacity (for example, 0 Nm). Further, the control apparatus 10 drives the shift actuator 39 to move the movable gear Gn1 of the next transmission mechanism Tn toward the stationary gear Gn2. Still further, the control apparatus 10 changes the prior clutch Cp from the engaged state to a half-engaged state. Here, the target torque capacity Tcp of the prior clutch Cp is decreased to a value corresponding to the target engine torque Te.

Thereafter, the control apparatus 10 starts the torque phase to switch the paths to transmit the torque of the engine 20 (t2). The control apparatus 10 changes the prior clutch Cp from the half-engaged state to the released state, and changes the next clutch Cn from the released state to the half-engaged state. Specifically, the control apparatus 10 increases the target torque capacity Tcp of the next clutch Cn to a value corresponding to the target engine torque Te.

Thereafter, the control apparatus 10 starts the inertia phase to decrease the engine rotation speed Se (t3). Specifically, the control apparatus 10 decreases the engine torque Te so as to become relatively lower than the target torque capacity Tcn of the next clutch Cn to decrease the engine rotation speed Se. In other words, the control apparatus 10 increases the target torque capacity Tcn of the next clutch Cn so as to become relatively higher than the engine torque Te to decrease the engine rotation speed Se.

Thereafter, the control apparatus 10 starts the dog release phase (t4). Specifically, the control apparatus 10 drives the shift actuator 39 to move the movable gear Gp1 of the prior transmission mechanism Tp toward the neutral position. Thereafter, the control apparatus 10 returns the prior clutch Cp and the next clutch Cn to the engaged state (t5). With the above, transmission control in the first control mode is finished.

Figure 7:
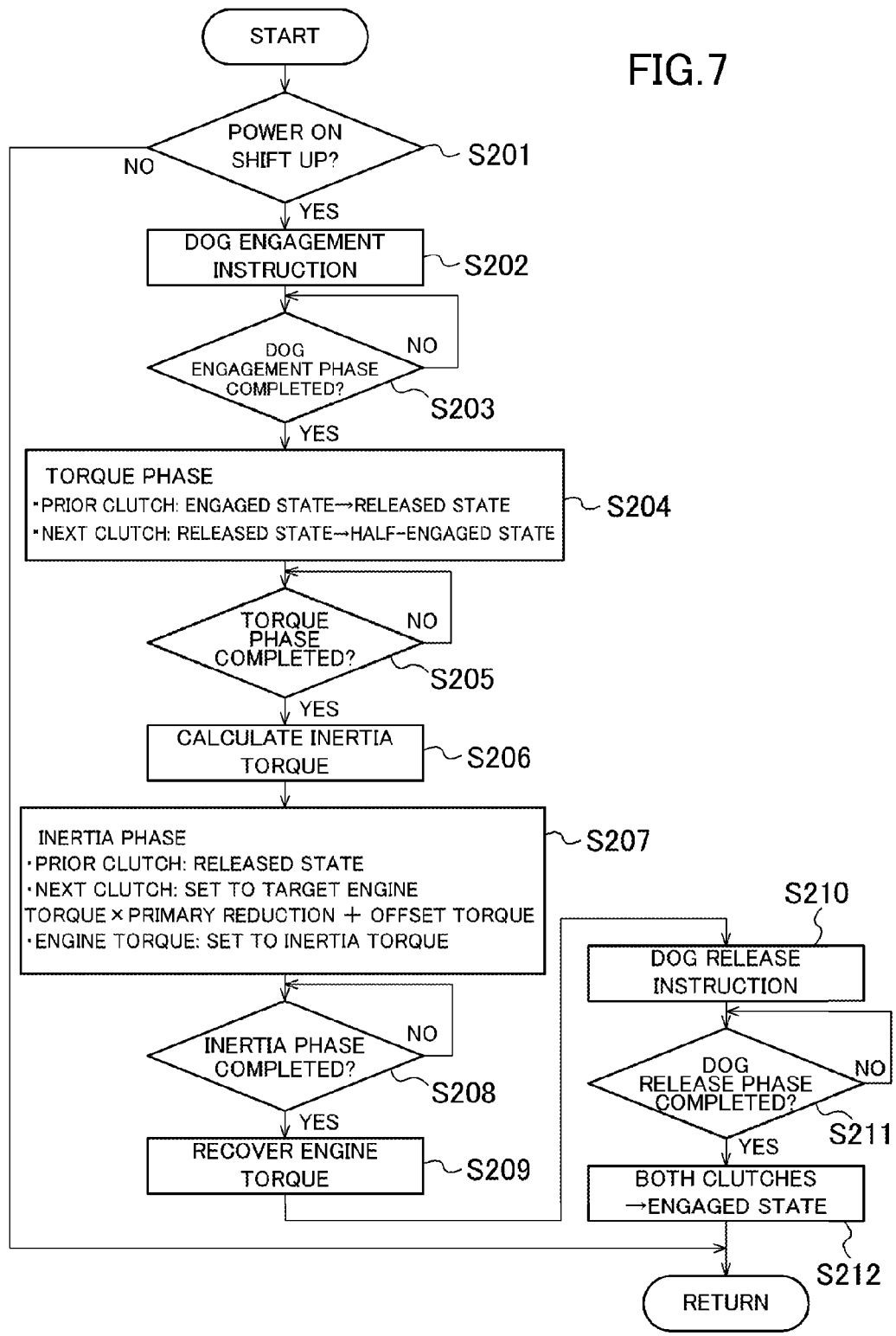
FIG. 7 is a flowchart showing an operation example in the first control mode.

FIG. 7 is a flowchart showing an operation example in the first control mode. At S201, the control apparatus 10 determines whether or not the transmission control is in the first control mode (power on shift up control). When the transmission control is not in the first control mode (S201: NO), the control apparatus 10 finishes the processing.

At S202, the control apparatus 10 outputs a dog engagement instruction to execute the dog engagement phase (t1 in FIG. 6). A dog engagement instruction includes an instruction to change the next clutch Cn from the engaged state to the released state and an instruction to move the movable gear Gn1 of the next transmission mechanism Tn toward the stationary gear Gn2. A dog engagement instruction further includes an instruction to change the prior clutch Cp from the engaged state to the half-engaged state. Specifically, the target torque capacity of the prior clutch Cp is set such that a value obtained by dividing it by a primary reduction ratio becomes equal to the target engine torque.

At S203, the control apparatus 10 determines whether or not the dog engagement phase has been completed. As a determination method, the following method is possible. For example, when it is determined, based on a signal from the gear position sensor 19b, that the shift cam 39b is positioned within a range corresponding to a dog engagement, it is determined that the dog engagement phase has been completed. Further, in a structure in which a sensor that determines the rotation speed of the input shaft 32 is provided, completion of the dog engagement phase may be determined when the difference between a value obtained by dividing the engine rotation speed by a primary reduction ratio and the input shaft rotation speed is included in a range corresponding to dog engagement.

At S204, the control apparatus 10 executes the torque phase (t2 in FIG. 6). At the start of the torque phase, an instruction to change the prior clutch Cp to the released state and an instruction to change the next clutch Cn to the half-engaged state are output. Specifically, when the target engine torque is larger than a certain value (for example, 0 Nm), the target torque capacity of the next clutch Cn is set such that a value obtained by dividing the target torque capacity by a primary reduction ratio becomes equal to the target engine torque. Meanwhile, when the target engine torque is smaller than a certain value (for example, 0 Nm), the target torque capacity of the next clutch Cn is set to the certain value (for example, 0 Nm).

At S205, the control apparatus 10 determines whether or not the torque phase has been completed. Specifically, whether or not the transmission torque capacities of the clutches 40A, 40B have reached the respective target torque capacities is determined based on the signals from the respective clutch sensors 19c, 19d.

Figures 8, 9, 10:
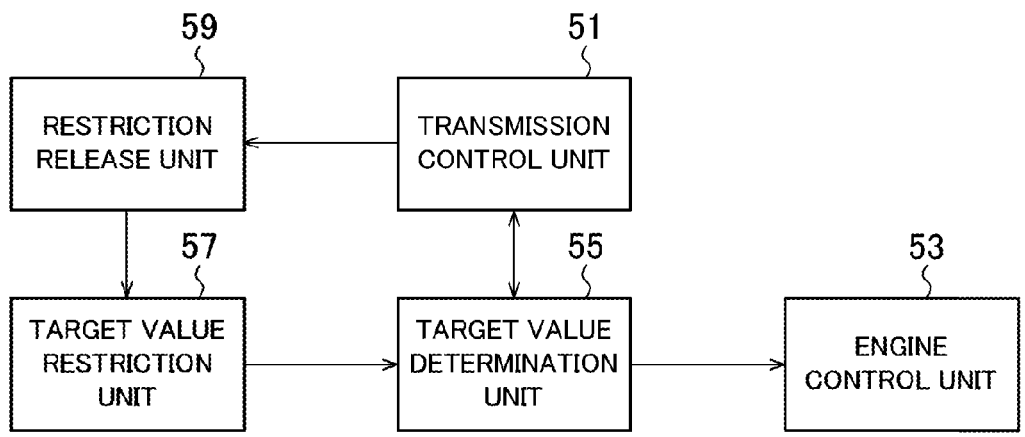
FIG. 8 shows an example of content of a table concerning a duration of an inertia phase.
FIG. 9 is a block diagram showing an example of a functional structure of the control apparatus.
FIG. 10 is a diagram showing an example of a threshold for an engine rotation speed in accordance with a throttle opening degree.

At S206, the control apparatus 10 calculates an inertia torque. An inertia torque is a target engine torque applied at the inertia phase (Te in FIG. 6). An inertia torque is obtained, using, for example, an expression of (current engine rotation speed−engine rotation speed after transmission)/inertia phase duration×inertia around crank. An inertia phase duration is read from a table, such as shown in FIG. 8, for example, that correlates an inertia phase duration, a shift step, and an accelerator opening degree. Further, an inertia around crank is an inertia due to an object present around the crank shaft 21, and can be obtained in advance at the stage of designing the engine 20, or the like.

At S207, the control apparatus 10 executes the inertia phase to decrease the engine rotation speed Se (t3 in FIG. 6). With the inertia phase started, the target engine torque is set to the inertia torque calculated at S206. Further, the target transmission torque of the prior clutch Cp is set to the minimum value (for example, 0 Nm). Still further, the target transmission torque of the next clutch Cn is set to a value obtained by multiplying the target engine torque determined based on the accelerator opening degree by a primary reduction ratio and then adding an offset torque. Note here that an offset torque takes a value that addresses a situation in which the inertia phase does not progress as the target transmission torque Tcn of the next clutch Cn differs from the actual transmission torque capacity, being a value determined in accordance with a period of time elapsed after the start of S207, for example.

At S208, the control apparatus 10 determines whether or not the inertia phase has been completed. For example, it is determined that the inertia phase has been completed when a condition|drive shaft rotation speed×gear ratio after transmission×primary reduction ratio−engine rotation speed|<threshold is met. Further, when a condition, for example, (drive shaft rotation speed×gear ratio before transmission×primary reduction ratio−engine rotation speed)/(drive shaft rotation speed×(gear ratio before transmission gear ratio after transmission)×primary reduction ratio) >threshold is met, completion of the inertia phase preferably is determined. Still further, completion of the inertia phase may also be determined when one or both of the above mentioned conditions is/are met.

At S209, the control apparatus 10 returns the target engine torque to a normal value obtained based on the accelerator opening degree.

At S210, the control apparatus 10 outputs a dog release instruction to execute the dog release phase (t4 in FIG. 6). A dog release instruction includes an instruction to move the movable gear Gn1 of the prior transmission mechanism Tp to the neutral position.

At S211, the control apparatus 10 determines whether or not the dog release phase has been completed. As a determination method, the following method is possible. For example, when it is determined, based on a signal from the gear position sensor 19b, that the shift cam 39b is positioned in a range corresponding to dog release, completion of the dog release phase is determined. Further, in a structure in which a sensor that determines the rotation speed of the input shaft 32 is provided, completion of the dog release phase may be determined when the difference between a value obtained by dividing the engine rotation speed by a primary reduction ratio and the input shaft rotation speed is in a range corresponding to dog release.

At S212, the control apparatus 10 outputs an instruction to change the prior clutch Cp and the next clutch Cn to the engaged state. With the above, transmission control in the first control mode (power on shift up control) is finished.

FIG. 9 is a block diagram showing an example of a functional structure of the control device 10. The control device 10 includes a shift control unit 51, an engine control unit 53, a target value determination unit 55, a target value restriction unit 57, and a restriction release unit (target value change unit) 59. The respective units included in the control device 10 are preferably implemented by the CPU of the control apparatus 10 by executing a program or programs stored in the memory.

Upon input of a transmission instruction from the shift switch 19f, the transmission control unit 51 executes the transmission control, and drives the clutch actuators 49A, 49B and the shift actuator 39 (see FIGS. 5 to 7). Further, the transmission control unit 51 calculates the target torque capacities of the clutches 40A, 40B and an inertia torque used at the inertia phase based on the target engine torque supplied from the target value determination unit 55. Further, the shift control unit 51 notifies the restriction release unit 59 of start of a gear change period or of each phase included in a gear change period.

The engine control unit 53 drives the fuel injection unit 22, the throttle actuator 23, and the ignition plug 24 provided in the engine 20 such that an actual output torque of the engine 20 becomes closer to the target engine torque supplied from the target value determination unit 55. For example, the throttle opening degree adjusted by the throttle actuator 23 is increased when increasing the output torque of the engine 20. Meanwhile, when decreasing the output torque of the engine 20, the throttle opening degree adjusted by the throttle actuator 23 is decreased, the amount of fuel injected by the fuel injection unit 22 is reduced, or the ignition timing by the ignition plug 24 is delayed.

The target value determination unit 55 determines the target engine torque, based on the accelerator operation amount input from the accelerator sensor 19g, and supplies the target engine torque to the transmission control unit 51 and the engine control unit 53. For example, with reference to a map stored in a memory that correlates an accelerator operation amount and a target engine torque, the target value determination unit 55 determines the target engine torque. Further, the target value determination unit 55 set the inertia torque, supplied from the transmission control unit 51, as the target engine torque at the inertia phase. Further, having been notified of an over-revolution state by the target value restriction unit 57, the target value determination unit 55 restricts the target engine torque to a negative value.

The target value restriction unit 57 determines whether or not the engine rotation speed input from the engine rotation speed sensor 19a exceeds a threshold (that is, whether or not it is in an over-revolution state), and, when it is in an over-revolution state, notifies the target value determination unit 55 of that fact to cause the target value determination unit 55 to restrict the target engine torque to a negative value. Having received the notice of the over-revolution state, the target value determination unit 55 restricts the target engine torque to a negative value to cause the engine control unit 53 to apply engine brake (so-called over-revolution control). The engine brake refers to a condition in which an output torque output from the engine 20 to the torque transmission path is smaller than a load torque input from the torque transmission path to the engine 20.

For example, as shown in FIG. 10, a threshold to determine whether or not it is in an over-revolution state may vary depending on a throttle opening degree. In the example shown in FIG. 10, the engine rotation speed corresponds to the threshold decreases as the throttle opening degree increases.

When the transmission control unit 51 executes transmission control, the restriction release unit 59 outputs an instruction to release restriction on the target engine torque to the target value restriction unit 57 at a predetermined time. Further, in order to determine a timing at which to output a release instruction, the restriction release unit 59 receives a notice of start of a gear change period or of each phase included in a gear change period from the transmission control unit 51. Having received the release instruction, the target value restriction unit 57 stops notifying the target value determination unit 55 of the over-revolution state, and causes the target value determination unit 55 to release restriction on the target engine torque.

Specifically, the restriction release unit 59 increases the value of the threshold to restrict the target engine torque to thus release restriction on the target engine torque. That is, when the value of the threshold is increased so as to exceed the engine rotation speed, the engine rotation speed resultantly becomes smaller than the threshold, and accordingly, restriction on the target engine torque is no longer executed.

In releasing the restriction on the target engine torque, the target engine torque restricted to a negative value is returned to a positive value. For example, the target engine torque is set to a normal value obtained based on an accelerator operation amount. However, the target engine torque is set to an inertia torque at the inertia phase.

In the following, three non-limiting operation example cases in which the timing of releasing restriction on the target engine torque are different will be described.

First Operation Example

Figure 11:
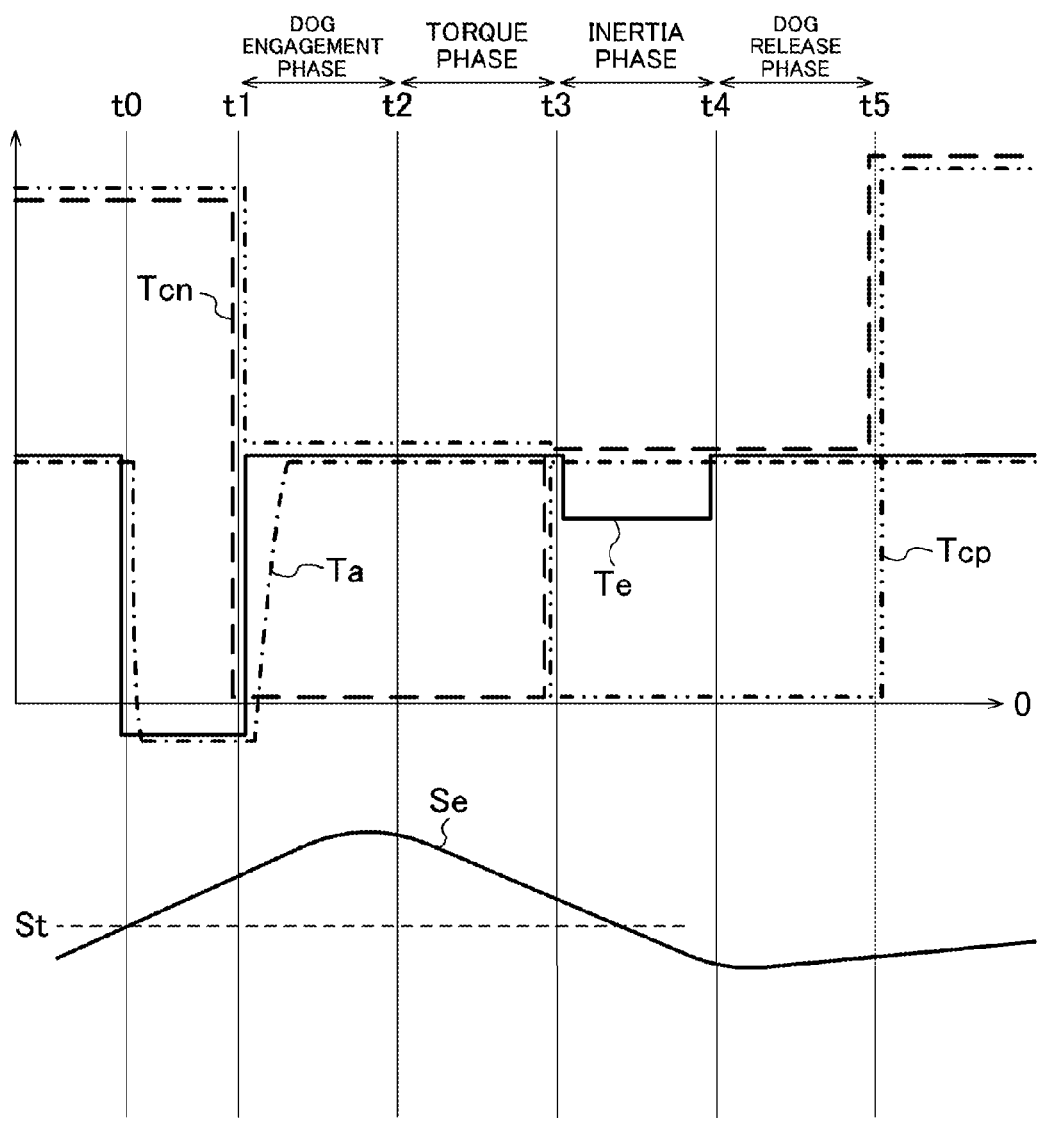
FIG. 11 is a time chart explaining a first operation example.

FIG. 11 is a time chart explaining a first operation example. Below, a difference from FIG. 6 will be mainly described. The alternate long and short dash line in FIG. 11 indicates the engine torque Ta to be actually output. Although FIG. 11 shows a case in which the engine rotation sped Se exceeds the threshold St at the time t0, which is before the start time t1 in the gear change period, this is not limited.

When the target value restriction unit 57 detects that the engine rotation speed Se exceeds the threshold St (t0), the target value determination unit 55 sets the target engine torque Te to a negative value to cause the engine control unit 53 to apply engine brake. Thereafter, when the transmission control unit 51 starts transmission control (t1), the restriction release unit 59 outputs a restriction release instruction to release restriction on the target engine torque Te. With the above, the target engine torque Te returns to a normal value obtained based on an accelerator operation amount as the shift control starts.

Figure 12:
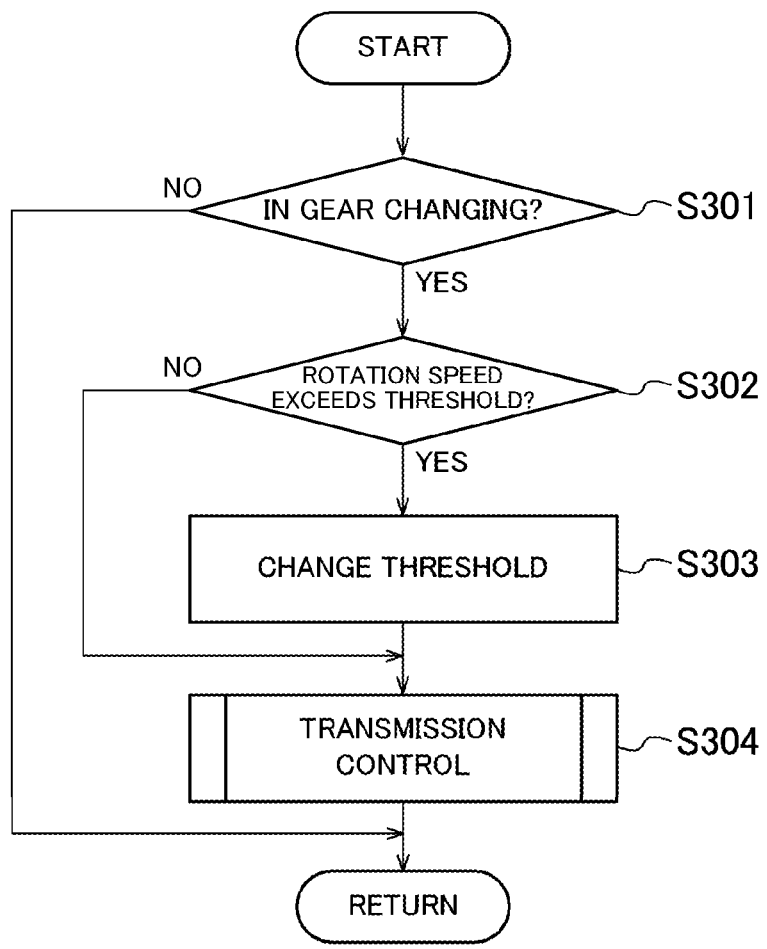
FIG. 12 is a flowchart showing the first operation example.

Specifically, as shown in FIG. 12, during the gear change period (S301: YES) with the engine rotation speed in excess of the threshold (S302: YES), the restriction release unit 59 increases the value of the threshold to thus release restriction on the target engine torque (S303). Then, the transmission control unit 51 executes shift control (S304).

With the above, when the transmission control starts, restriction on the target engine torque is ended, and the target engine torque returns to a normal value before the inertia phase (that is, rotation control). Therefore, it is possible to prevent shift shock during the inertia phase, and also to efficiently utilize the output torque from the engine 20. Further, with an arrangement in which the target engine torque is not restricted during a gear change period, it is possible to simplify the processing.

Second Operation Example

Figure 13:
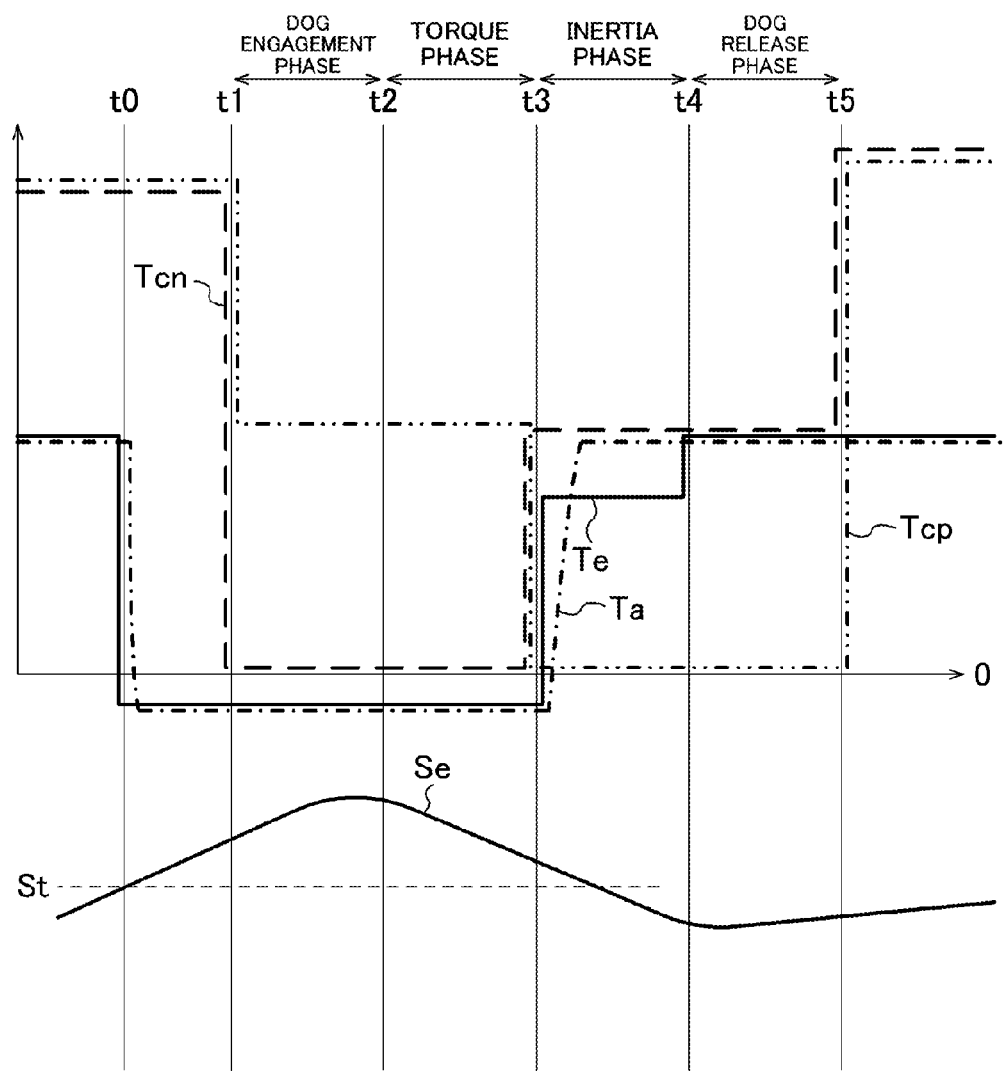
FIG. 13 is a time chart explaining a second operation example.

FIG. 13 shows a time chart explaining a second operation example. Below, a difference from the above described first example will be mainly described.

When the target value restriction unit 57 detects that the engine rotation speed Se exceeds the threshold St (t0), the target value determination unit 55 sets the target engine torque Te to a negative value to cause the engine control unit 53 to apply the engine brake. Thereafter, when the transmission control unit 51 starts the inertia phase (t3), the restriction release unit 59 outputs a restriction release instruction to release restriction on the target engine torque Te. With the above, the target engine torque Te is set to the inertia torque as the inertia phase starts.

Figure 14:
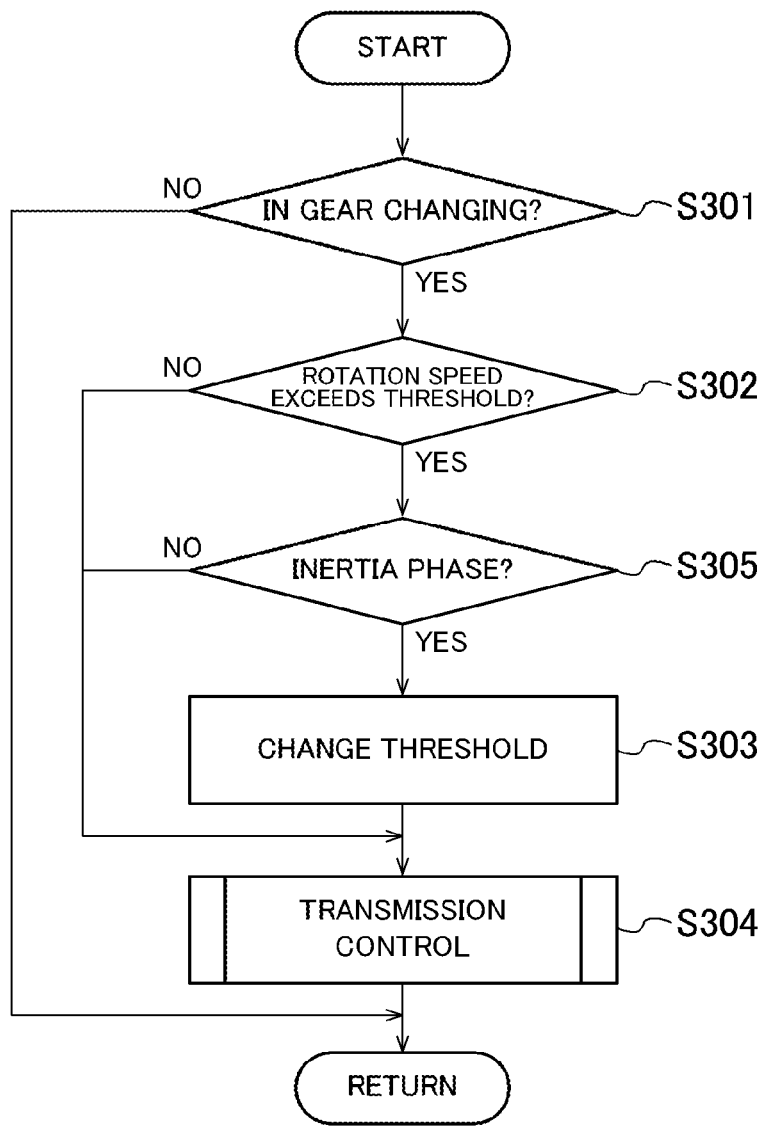
FIG. 14 is a flowchart showing the second operation example.

Specifically, as shown in FIG. 14, during the gear change period (S301: YES) with the engine rotation speed in excess of the threshold (S302: YES), and further in the inertia phase (S305: YES), the restriction release unit 59 increases the value of the threshold to thus release restriction on the target engine torque (S303). Then, the transmission control unit 51 executes transmission control (S304).

With the above, when the inertia phase starts, restriction on the target engine torque is ended, and the target engine torque is set to the inertia torque. Therefore, it is possible to prevent shift shock during the inertia phase, and also to efficiently utilize the output torque from the engine 20. Further, as the target engine torque is kept restricted until start of the inertia phase, it is possible to readily prevent excessive increase of the engine rotation speed.

Third Operation Example

Figure 15:
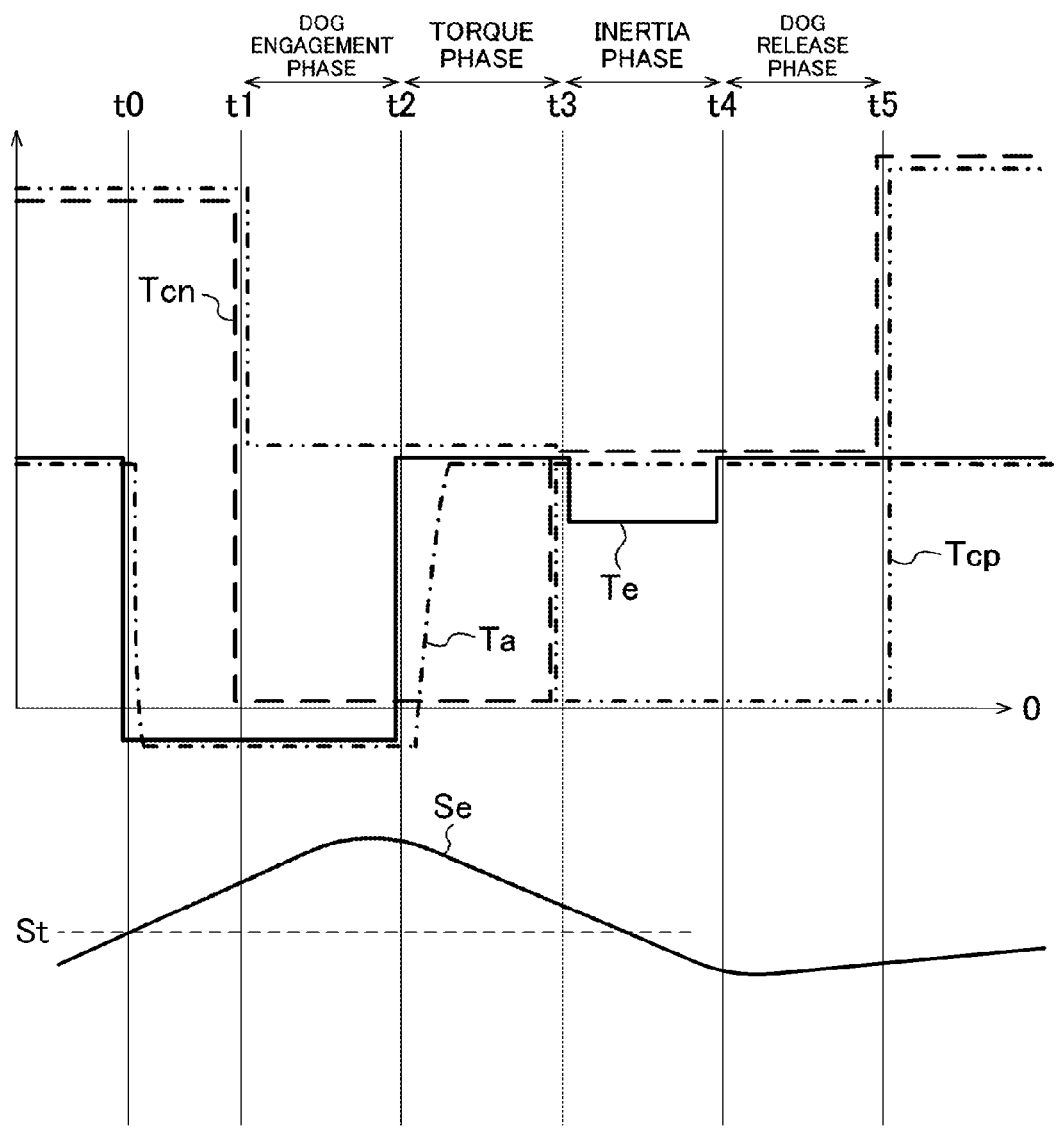
FIG. 15 is a time chart explaining a third operation example.

FIG. 15 is a time chart explaining a third operation example. Below, a difference from the above described first and second examples will be mainly described.

When the target value restriction unit 57 detects that the engine rotation speed Se exceeds the threshold St (t0), the target value determination unit 55 sets the target engine torque Te to a negative value to cause the engine control unit 53 to apply engine brake. Thereafter, when the transmission control unit 51 starts the torque phase (t2), the restriction release unit 59 outputs a restriction release instruction to release restriction on the target engine torque Te. With the above, the target engine torque Te returns to a normal value obtained based on the accelerator operation amount as torque phase starts.

Figure 16:
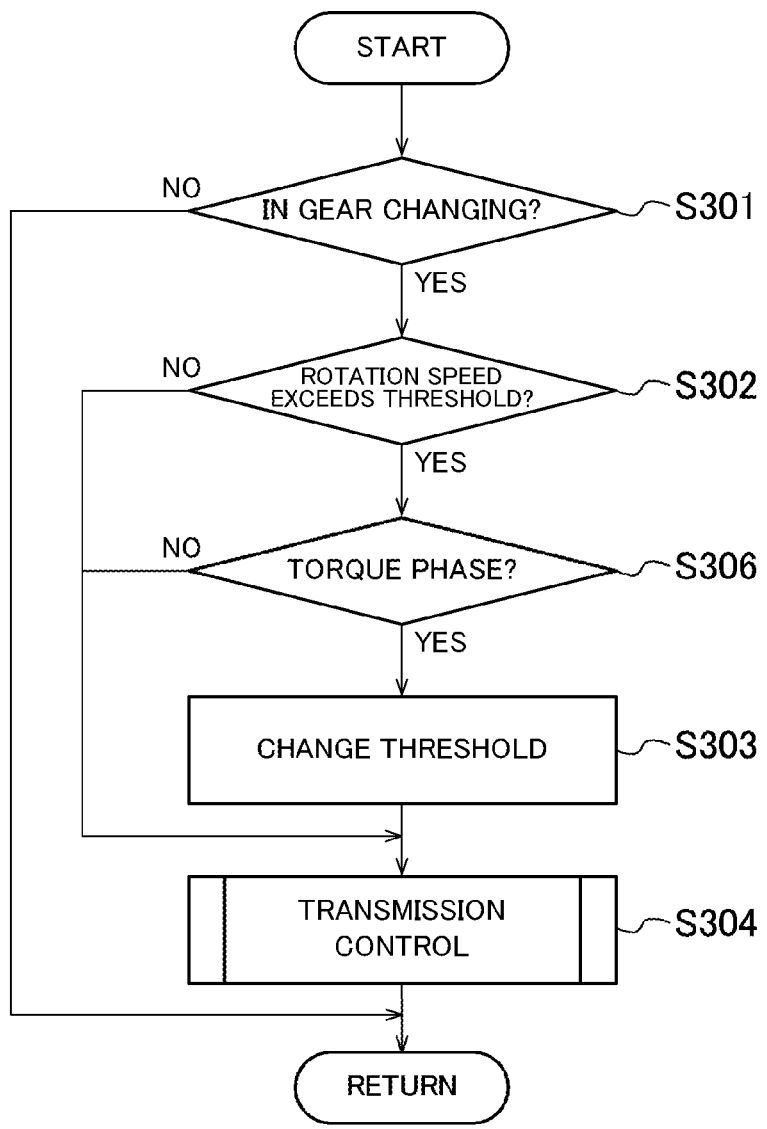
FIG. 16 is a flowchart showing the third operation example.

Specifically, as shown in FIG. 16, during the gear change period (S301: YES) with the engine rotation speed in excess of the threshold (S302: YES), and further in the torque phase (S306: YES), the restriction release unit 59 increases the value of the threshold to thus release restriction on the target engine torque (S303). Then, the transmission control unit 51 executes transmission control (S304).

With the above, when the torque phase starts, restriction on the target engine torque is ended, and the target engine torque returns to a normal value before the inertia phase. Therefore, it is possible to prevent shift shock during the inertia phase, and also to efficiently utilize the output torque from the engine 20. Further, with an arrangement in which restriction on the target engine torque is ended upon start of the torque phase, it is possible to ensure a time for the actual engine torque Ta to recover before the start of the inertia phase starts.

Although a preferred embodiment of the present invention has been described above, the present invention is not limited to the above described preferred embodiment, and various modified preferred embodiments are possible for a person skilled in the art.

Figure 17:
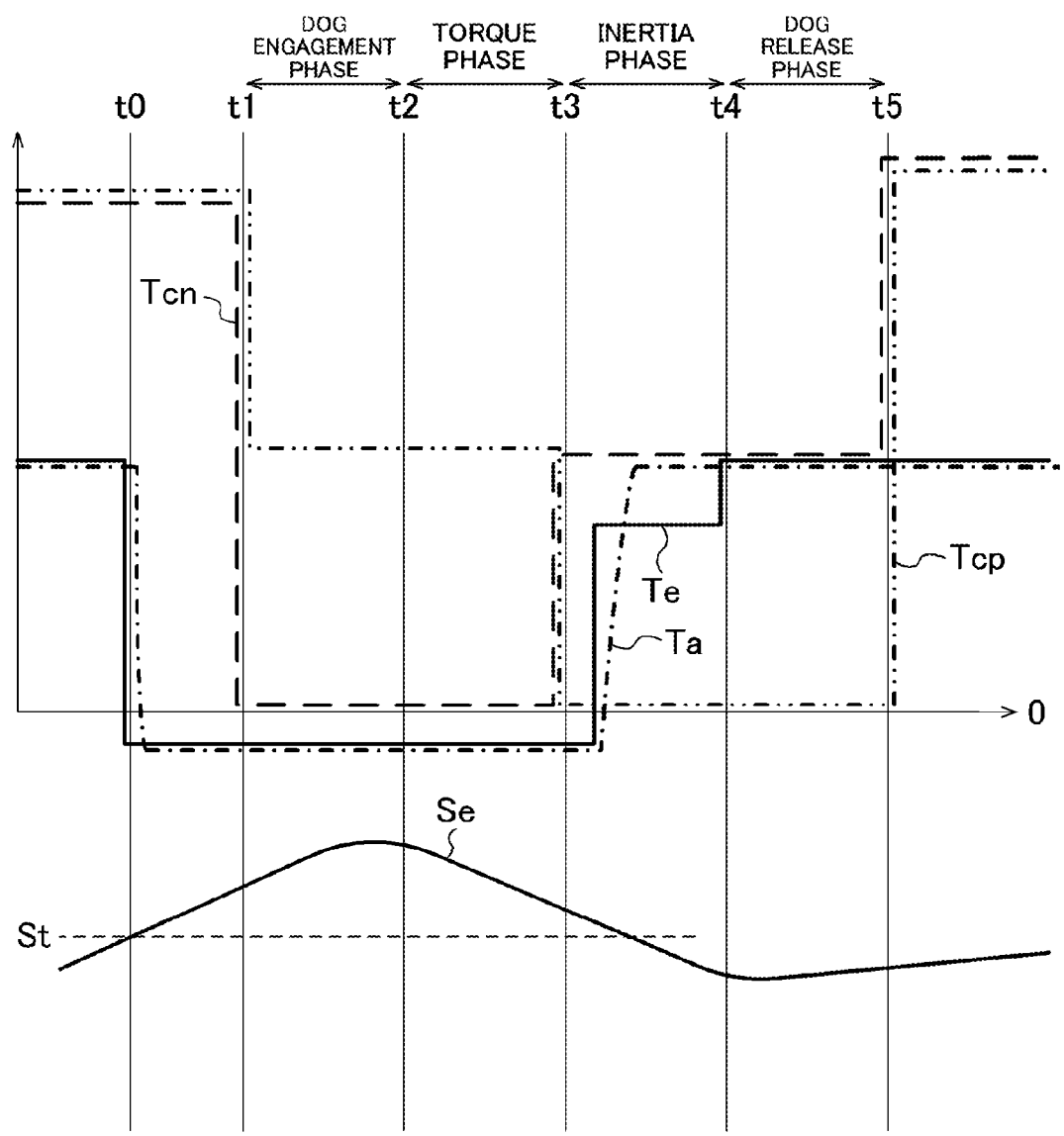
FIG. 17 is a time chart explaining a modified example.

Although restriction on the target engine torque preferably is ended at either of the start time t1 of the gear change period, the start time t2 of the torque phase, or the start time t3 of the inertia phase in the above described three examples, this is not limited. For example, restriction on the target engine torque may be ended during the dog engagement phase or the torque phase. Further, as shown in FIG. 17, when restriction on the target engine torque is ended before the engine rotation speed becomes smaller than the threshold, even in the middle of the inertia phase, it is possible to prevent shift shock more effectively than related art.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle control apparatus mounted in a vehicle including an engine, two clutches mounted downstream of the engine to individually receive an output torque from the engine, two actuators to change torque capacities of the two clutches, and two dog clutch type transmission mechanisms mounted downstream of the two clutches and including a common output shaft, the vehicle control apparatus being configured and programmed to execute, during a gear change period, switching control to switch transmission paths of the output torque from one of the two clutches and two transmission mechanisms to another of the two clutches and two transmission mechanisms and to execute rotation control to change a rotation speed of the engine by ensuring a difference between the output torque and the torque capacities, the vehicle control apparatus comprising:

a target value determination unit configured and programmed to determine a target value of the output torque;

a target value restriction unit configured and programmed to restrict the target value such that the output torque becomes smaller than a load torque input from the transmission path to the engine when the rotation speed of the engine exceeds a threshold; and a restriction release unit configured and programmed to release a restriction on the target value before the rotation control is started during the gear change period.

2. The vehicle control apparatus according to claim 1, wherein the switching control is executed before the rotation control during the gear change period; and the restriction release unit is configured and programmed to release the restriction on the target value before the switching control is started.

3. The vehicle control apparatus according to claim 1, wherein the restriction release unit is configured and programmed to release the restriction on the target value before the gear change period is started.

4. A vehicle comprising the vehicle control apparatus according to claim 1.

5. A motor comprising the vehicle control apparatus according to claim 1.

6. A vehicle control apparatus mounted in a vehicle including an engine, two clutches mounted downstream of the engine to individually receive an output torque from the engine, two actuators to change torque capacities of the two clutches, and two dog clutch type transmission mechanisms mounted downstream of the two clutches and including a common output shaft, the vehicle control apparatus being configured and programmed to execute, during a gear change period, switching control to switch transmission paths of the output torque from one of the two clutches and two transmission mechanisms to another of the two clutches and two transmission mechanisms and to execute rotation control to change a rotation speed of the engine by ensuring a difference between the output torque and the torque capacities, the vehicle control apparatus comprising:

a target value determination unit configured and programmed to determine a target value of the output torque;

a target value restriction unit configured and programmed to restrict the target value such that the output torque becomes smaller than a load torque input from the transmission path to the engine when the rotation speed of the engine exceeds a threshold; and a target value change unit configured and programmed to change the target value such that the output torque becomes larger than the load torque before the rotation speed of the engine becomes smaller than the threshold during the gear change period.

7. A vehicle comprising the vehicle control apparatus according to claim 6.

8. A motor comprising the vehicle control apparatus according to claim 6.

* * * * *